Patented Aug. 22, 1950

2,519,961

UNITED STATES PATENT OFFICE 2,519,961

GELATIN DESSERT

Donald P. Grettie, Chicago, Ill., assignor to Swift & Company, Chicago, Ill., a corporation of Illinois No Drawing. Application February 3, 1949, Serial No. 74,470

17 Claims. (Cl. 99—130)

This invention relates to the treatment of gelatin and gelatin-containing products, and more particularly to improving the rate at which dilute acid solutions of gelatin solidify to a gel when cooled.

Gelatin is a pure protein food, easily digested and readily utilized by the human body. It is obtained by curing the white connective tissue of animal skins, sinews, or bones with acids or alkalies and extracting the converted collagen therefrom by means of water with the aid of heat.

In the manufacture of gelatin, the skins or other raw gelatin-containing material after suitable treatment by a curing process are placed in kettles, covered with water, heated to the required temperature, and allowed to soak for a predetermined length of time. The gelatin is then drawn off as a gelatin liquor and filtered to remove suspended matter. Subsequently, the gelatin liquor is evaporated, filtered again, and then spread on an endless belt where it is chilled through refrigeration. Upon emerging from the refrigeration chamber, the protein as sheets of jelly is spread upon aluminum wire netting and dried by subjecting it to a stream of first cool and later warm air. The dried flakes are ground to any desired degree of fineness. This process of extracting gelatin from the raw gelatin-containing materials with attending filtration, evaporation, chilling, drying, and grinding, is repeated several times until the kettle stocks yield no further appreciable quantity of gelatin liquor. These extractions consecutively produce gelatin which has undergone more and more hydrolysis so that the early runs produce a higher test gelatin and the latter runs a lower test gelatin. Commercial gelatins of specified tests are made by blending different runs to produce the desired product.

In the preparation of gelatin, the extraction process is usually preceded by a curing treatment in which the raw material is soaked in either an acid solution or an alkali solution, such as lime, which aids the extraction process. Suitable acidulating agents are hydrochloric acid; sulfuric acid; or an organic acid, such as citric. Color, pH, clarity, jelly strength, and viscosity of the finished gelatin are controlling factors in the selection of a cure to produce the desired gelatin. By "gelatin" I mean principally gelatin that is used for desserts, salads, jellied meats, and the like.

Gelatin dessert powders are composed of gelatin, sugar, coloring compounds, flavor, and fruit acids. In standard gelatin dessert usage, approximately 100 grams of gelatin dessert formula are dissolved in 500 cc. of hot water. When dissolved in hot water, it is desirable that they produce brilliantly clear-colored solutions having proper sweetness and tartness. The solution is cooled at room temperature for about 30 minutes and then placed in the ordinary household refrigerator. Such a preparation should become a jelly within two hours. It is most important that the gelatin preparation have the ability to congeal to a jelly rapidly when cooled.

In the formula used for desserts, salads, and the like, comprising gelatin, sugar, flavors, and fruit acids, with water being added by the consumer in preparing the gelatin product, fruit acids, such as citric and tartaric acids, are used to give the gelatin a pleasing tart flavor. A sufficient quantity of these fruit acids is employed to produce a pH of below 4 and generally a pH of about 3.5 to 3.0 to bring out the desired tart flavor. Unfortunately, however, gelatin, whether it be acid cured or lime cured, gels or sets up much more slowly in an acid solution than it does prior to the addition of the acids. This property is very undesirable because desserts are usually desired to be prepared the same day on which they are intended to be consumed. It is important, therefore, that the gelatin dessert have the ability to set to a firm jelly rapidly and thus be capable for use in a relatively short time, usually in about two hours. On the other hand, if the gelatin is prepared with the intent of being used the following day, it is desirable that it not be rubbery and hard and consequently unpalatable. In order, therefore, to obtain a dessert gelatin possessing the desirable property of a quick rate of gelation without attending unpalatableness, the method of treating pork skins or other collagen-bearing materials with alkali has hitherto been utilized almost exclusively although this process requires a curing period of 20 to 30 days in contrast to the 10 to 40 hours in the hydrochloric acid-cure method. In addition, the alkali-cured gelatin possesses lower jelly strength and an appearance which is inferior to acid-cured gelatin. The use of sulfuric acid in place of hydrochloric acid produces a gelatin from pork skins which is relatively low in jelly strength. The following Table I illustrates the varying characteristics of gelatin obtained from hydrochloric acid, sulfuric acid, and lime cures:

TABLE I

*Comparison of gelatins from same lot of pork skins using different cures*

| Curing Medium | Curing Time | Average Jelly Strength in Grams | Viscosity in Millipoises | Per Cent Yield |
|---|---|---|---|---|
| Hydrochloric Acid-pH of curing solution at end of cure about 4. | 40 hrs | 275 | 60 | 25 |
| Sulfuric Acid-pH of curing solution at end of cure about 4. | 40 hrs | 250 | 50 | 22 |
| Lime Solution Saturated | 20 days | 245 | 80 | 23 |

Thus, in the normal manufacture of gelatin desserts, an alkali-cured pork or calf stock gelatin is preferred because at the proper jelly strength and viscosity it yields a clear solution, which at the pH of fruit acids congeals rapidly when chilled. Gelatin from hydrochloric acid-cured pork skins has not been used as a dessert gelatin because it does not congeal quickly in the presence of acids, such as the fruit acids. Other mineral acids, such as sulfuric or phosphoric, are not used because they produce gelatin having the disadvantage of low yields and low jelly strength or a high ash content.

Nevertheless, of the various raw materials and curing agents that may be employed in the commercial manufacture of gelatin, as hereinbefore described, it would be most desirable to make use of hydrochloric acid for curing pork skins because pork skins are particularly susceptible to curing with hydrochloric acid and yield a larger percentage of a gelatin having a high jelly strength after only about 40 hours of curing time. Moreover, such an acid-cured gelatin is characterized by good clarity and brilliance.

It would also be very desirable in many instances to improve the rate of gelation of lime-cured gelatin employed in a gelatin dessert formula since the desired "set" would be obtained rapidly with a lower concentration of gelatin therein.

An object of this invention is to provide a gelatin having an improved rate of gelation in an acid medium.

Another object of this invention is to provide a gelatin rendered from hydrochloric acid-cured pork skins suitable for gelatin desserts, salads, and the like.

A further object of the invention is to provide a gelatin suitable for gelatin desserts which will retain the desirable properties of high test and clarity in the gelatin solution wtihout the disadvantage of slow gelation.

Still another object of this invention is to provide a gelatin dessert product in which the concentration of fruit acids may be increased to produce a more pronounced tart flavor without substantially decreasing the rate of gelation or increasing the amount of gelatin required.

Another object of this invention is to provide a gelatin product having a desirable tart flavor and high rate of gelation with a smaller concentration of gelatin than heretofore.

Other objects of this invention will be evident from the description and claims which follow.

Although the invention deals principally with gelatin from hydrochloric acid-cured pork skins and the like, it is also possible to employ the sulfate ion to increase the rate of gelation of gelatin extracted from other collagen-bearing materials not cured in an acid medium, such as lime-cured gelatin.

Broadly the invention contemplates the addition of a sulfate ion-producing composition, such as the alkali metal sulfates; ammonium sulfate; soluble alkaline earth sulfates; sulfuric acid; and other edible, noncolored, water soluble, sulfate ion-producing compositions to gelatin used in an acidic medium such as present in the standard gelatin dessert solution. The sulfate ion-producing composition should be soluble in water to the extent of about 0.2 gram per 100 ml. water. Sulfate ion-producing compositions which produce harmful physiological effects or which color, tan, or otherwise insolubilize the gelatin at the concentration employed, should not be used in edible gelatin products. The sulfates of copper, iron, nickel, tin, and zinc, although good sources of sulfate ions, should be avoided when preparing edible gelatin products. Many of these trivalent and bivalent cations are either deleterious food adulterants or exert a tanning and insolubilizing effect on the protein. Certain of the salts also impart undesirable color characteristics to the gelatin which would not be acceptable in an edible gelatin product. For these reasons, the above trivalent and bivalent sulfates are purposely avoided in the preparation of edible gelatin products.

When anions other than sulfate ions are introduced into acidic gelatin solutions, the effect on the rate of gelation is either negligible or altogether negative at any given pH. Thus, when phosphate ions or organic acids, such as acetic, citric, and tartaric acid, are added to a gelatin solution, the change in the rate of gelation is negligible in comparison with the effect of the sulfate ion. Chloride and nitrate ions do not favorably affect the rate of gelation and generally exhibit a purely negative effect since they reduce the rate of gelation to a point where they actually liquefy gelatin gels.

The property of the sulfate ion of increasing the rate of gelation, as described herein, is peculiar to the sulfate ion added to gelatin which is subsequently dissolved in a relatively strong acidic medium, such as existing in solutions of gelatin dessert formulas containing fruit acids. When, for example, sodium sulfate is present in a gelatin solution at the normal pH of dessert gelatin (4.5 to 6), as in the routine laboratory testing, the sulfate ion simply acts as an inert diluent and causes the ultimate jelly strength to be lowered approximately the same amount as produced by the same amount of moisture in a gelatin sample. Thus, the jelly strength of a gelatin solution will be lowered by approximately 5 grams for each per cent of either moisture or sodium sulfate present in the sample. A gelatin having a jelly strength of 240 grams will be lowered to 225 grams when 3 per cent of sodium sulfate is present in the gelatin at normal pH values.

To further illustrate the invention, the influence of the sulfate ion on the rate of gelation at various pH values is shown by the data set forth in Table II and Table III:

TABLE II

| Conc. Gelatin HCl-cured | Wt. Citric Acid | Wt. Sodium Sulfate | Jelly Strength | | |
|---|---|---|---|---|---|
| | | | 2 hr. | 20 hr. | pH |
| | Grams | Grams | | | |
| 2 g. per 100 ml. water | 0 | 0 | 14.7 | 22.5 | 7.2 |
| Same | 0 | .1 | 14.6 | 22.6 | 7.2 |
| Same | .09 | 0 | 13.4 | 21.5 | 4.45 |
| Same | .09 | .1 | 14.8 | 22.5 | 4.45 |
| Same | .18 | 0 | 10.6 | 19.5 | 3.9 |
| Same | .18 | .1 | 13.2 | 21.5 | 3.9 |
| Same | .27 | 0 | 8.6 | 17.2 | 3.55 |
| Same | .27 | .1 | 11.5 | 20.4 | 3.55 |
| Same | .36 | 0 | 7.6 | 16.5 | 3.35 |
| Same | .36 | .1 | 11.8 | 19.4 | 3.35 |
| Same | .5 | 0 | 6.1 | 15.5 | 3.08 |
| Same | .5 | .1 | 9.8 | 18.9 | 3.08 |

TABLE III

| Conc. Gelatin Lime-Cured | Wt. Citric Acid | Wt. Sodium Sulfate | Jelly Strength | | |
|---|---|---|---|---|---|
| | | | 2 hr. | 20 hr. | pH |
| | Grams | Grams | | | |
| 2 g. per 100 ml. water | 0 | 0 | 12.7 | 21.2 | 7.5 |
| Same | 0 | .1 | 12.9 | 21.1 | 7.45 |
| Same | .10 | 0 | 12.7 | 19.6 | 4.5 |
| Same | .10 | .1 | 13.1 | 19.6 | 4.52 |
| Same | .25 | 0 | 11.6 | 19.7 | 3.93 |
| Same | .25 | .1 | 13.2 | 19.8 | 3.97 |
| Same | .40 | 0 | 9.9 | 18.2 | 3.58 |
| Same | .40 | .1 | 12.3 | 19.2 | 3.61 |
| Same | .55 | 0 | 8.2 | 17.2 | 3.35 |
| Same | .55 | .1 | 11.6 | 18.7 | 3.35 |

The foregoing data show that the sulfate ion produces no beneficial effect at high pH values but has a very pronounced beneficial effect on the rate of gelation at pH values below 4. Thus, at a pH of 7.2, the sulfate ion has a retarding influence on the rate of gelation after two hours. Below a pH of 4.5, however, the sulfate ion begins to exert its beneficial influence and increases in effectiveness as the pH of the gelatin solution is lowered. At a pH of 3.08, it will be observed that the sulfate ion exerts a very marked beneficial effect on the rate of gelation.

The peculiar function of the sulfate ion in an acidic gelatin solution is extremely valuable in that it permits the use of hydrochloric acid-cured gelatin in a gelatin dessert formula. And, through the addition of a small amount of sulfate ion to lime-cured gelatin, for example, it is possible to obtain the desired high rate of gelation in a dessert formula with a substantially reduced concentration of gelatin therein.

In order to carry out experiments and compare rates of gelation of gelatin desserts, a standard procedure has been developed, which is as follows: A standard formula for a gelatin dessert is prepared consisting of 2 g. of 225 g. Bloom gelatin, 17.82 g. of sugar, and 0.2 g. of citric acid dissolved in 100 ml. of water. Any added material, such as buffer salts or sulfates, replaces an equal amount of sugar in the formula. The gelatin dessert sample is then placed in a 50° F. water bath and jelly strengths determined with a special Bloom Gelometer after 2 hours and again after 20 hours. By a special Bloom Gelometer is meant one that can be used to measure the jelly strength of a gelatin more sensitively by using analytical weights to depress the plunger in place of the lead shots customarily employed. The standard methods of analysis as used by the gelatin industry is described in Ind. & Chem. Eng. 16, 310 (1924). Jelly strength is the weight, expressed in grams, required to depress a gel 4 millimeters using a piston one square centimeter in area, which gel is formed by chilling the solution of 7.15 g. of gelatin in 100 cc. of distilled water at 10° C.

It should be observed that the two properties of jelly strength and rate of gelation are not identical since a high jelly strength gelatin may gel at a relatively slow rate in a gelatin dessert formula as compared with another gelatin of lower jelly strength. By rate of gelation is meant the time required for any given gelatin solution to gel to a given jelly strength. Concentration and temperatures may vary since only comparative values are sought.

In the production of gelatin extracted from hydrochloric acid-cured gelatin-containing material, the gelatin usually possesses a chloride ion content of around .2 percent. It has been found that the sulfate ion-producing composition has its maximum effect of increasing the rate of gelation of an acidic solution of gelatin at about 5 percent based on the dry weight of gelatin. Satisfactory results are obtained, however, when using between about one and ten percent sulfate ion-producing composition based on the dry weight of the gelatin.

The sulfate ion-producing composition may be added to the gelatin liquor at any stage in the manufacturing process after extraction. They may be added before or after filtration, before or after evaporation, or may be added as a powder by mixing with the powdered gelatin alone or with the other ingredients normally used in gelatin dessert products.

In order to further illustrate the invention, there is shown in Table IV a comparison of lime-cured pork skin gelatin, hydrochloric acid-cured pork skin gelatin, and hydrochloric acid-cured pork skin gelatin to which the indicated sulfate salts have been added in the indicated amounts. In securing these data, 2 g. samples of 225 g. Bloom gelatin and the indicated amounts of sulfate ions with 17.8 g. of sugar were dissolved in 100 cc. of water, and sufficient citric acid added to bring the pH to that shown in the table. To determine the rate of gelation for the different samples, jelly strengths were taken at 2 hours and then after 20 hours, holding at 50° F.

TABLE IV

| | Gelatin Blend | Wt. grams Sulfate | Jelly Strength | | |
|---|---|---|---|---|---|
| | | | 2 hr. grams | 20 hr. grams | pH |
| A | Gelatin (lime cured) | | 6.7 | 14.0 | 3.44 |
| B | Gelatin (hydrochloric acid cured) | | 4.2 | 10.2 | 3.42 |
| C | Gelatin (hydrochloric acid cured) Ammonium Sulfate | .06 | 6.1 | 12.0 | 3.33 |
| D | ----do---- | .10 | 7.7 | 13.7 | 3.42 |
| E | ----do---- | .15 | 8.3 | 14.5 | 3.42 |
| F | Gelatin (hydrochloric acid cured) Sodium Sulfate | .06 | 6.9 | 12.9 | 3.40 |
| G | Gelatin (hydrochloric acid cured) Potassium Sulfate | .04 | 6.1 | 12.0 | 3.5 |
| H | Gelatin (hydrochloric acid cured) Calcium Sulfate | .06 | 6.5 | 12.6 | 3.1 |

It is shown in the table that small amounts of sulfate ion-producing compositions added to the gelatin dessert solution accelerate the rate at which the gelatin solution congeals. The addition of about 3 percent of sulfate ion-producing composition, based on the dry weight of the gelatin, renders gelatin from hydrochloric acid-cured pork skins equivalent to lime-cured pork skin gelatin with respect to the rate of gelation at the pH of commercial gelatin desserts.

Table V shows the effect of the sulfate ion in resisting lowering of the rate of gelation of acidic gelatin solutions at lower pH values, some of said solutions containing a buffer salt.

TABLE V

| Sample | Wt. Gelatin HCl-cured | Citric Acid | Sodium Sulfate | Sod. Citr. | Sugar | Vol. Water | Jelly Strength | | |
|---|---|---|---|---|---|---|---|---|---|
| | | | | | | | 2 hr. | 20 hr. | pH |
| | Grams | Grams | Grams | Grams | Grams | | | | |
| 1 | 2 | .35 | 0 | 0 | 17.65 | 100 | 4.2 | 10.5 | 3.0 |
| 2 | 2 | .35 | .06 | 0 | 17.59 | 100 | 6.9 | 13.7 | 3.0 |
| 3 | 2 | .5 | 0 | .1 | 17.4 | 100 | 6.2 | 13.2 | 3.2 |
| 4 | 2 | .5 | .06 | .1 | 17.36 | 100 | 8.2 | 14.9 | 3.2 |

In Table V each formula was adjusted to obtain about the same degree of tartness. It is evident upon comparing Samples 1 and 2 that the addition of a sulfate ion-producing composition to the gelatin dessert formula does not alter the amount of citric acid required to produce a given pH or tartness in the dessert. It is also evident that the desired degree of tartness may be obtained when sulfate ions are used in a dessert formula containing a buffer salt and at the same time substantially increasing the rate of gelation. As a result of this beneficial effect of the sulfate ion on the rate of gelation, it is clear that the addition of a much larger amount of fruit acid, and therefore a much greater tartness is possible when sulfate ions are used without decreasing the rate of gelation below that of the standard buffered gelatin solution. The presence of sulfate ions in acidic gelatin solutions makes the gelatin more resistant to the slow gelling effect of low pH gelatin solutions and this characteristic of the sulfate ion in acidic gelatin solutions is independent of and supplemental to the beneficial effect of buffer salts.

Tables VI and VII further illustrate the beneficial effect of sulfate ions on acidic gelatin solutions which permit reducing the amount of gelatin required to obtain a desired gelatin strength within the specified two-hour time period.

From Table VI, it is evident that when one percent sodium sulfate is added to the standard gelatin formula, the amount of acid-cured gelatin used may be reduced 20 per cent and still obtain a satisfactory rate of gelation which is higher than that of the formula containing no sulfate ion. In a similar manner, Table VII shows that when one per cent sodium sulfate is added to the standard gelatin formula, the amount of lime-cured gelatin may be reduced 15 per cent without reducing the rate of gelation below a satisfactory standard. Since gelatin is the most expensive ingredient in a gelatin dessert formula, the foregoing property of the sulfate ion is of great commercial importance.

In the claims, the alkali sulfate group includes the ammonium radical in addition to the monovalent metals.

This application is a continuation-in-part application of my co-pending patent application Serial No. 608,838, filed October 3, 1945.

Obviously, many modifications and variations of the invention as hereinbefore set forth may be made without departing from the spirit and scope thereof, and therefore only such limitations should be imposed as are indicated in the appended claims.

I claim:

1. In a process of manufacturing a gelatin product having an improved rate of gelation in an acidic medium, the improvement which comprises: adding to a gel-forming material comprising gelatin extracted from a cured gelatin-containing material a water-soluble sulfate ion-producing composition in an amount between about 1 to 10 per cent based on the dry weight of the gelatin; the said sulfate ion substantially increasing the rate of gelation of a solution of the said gelatin in the presence of the acid.

2. A method of producing a gelatin product having a hight rate of gelation in an acidic solu-

TABLE VI

| Wt. Gelatin HCl-cured | Wt. Citr. Acid | Wt. Sod. sulfate | Weight Sugar | Volume Water | Jelly Strength | | |
|---|---|---|---|---|---|---|---|
| | | | | | pH | 2 hrs. | 20 hrs. |
| Grams | Grams | Grams | | | | | |
| 2 | .33 | none | 17.67 | 100 | 3.1 | 4.1 | 11.5 |
| 2 | .33 | .2 | 17.47 | 100 | 3.1 | 8.7 | 15.6 |
| 1.8 | .33 | .2 | 17.67 | 100 | 3.08 | 7.0 | 12.6 |
| 1.7 | .33 | .2 | 17.77 | 100 | 3.06 | 6.4 | 10.5 |
| 1.6 | .33 | .2 | 17.87 | 100 | 3.03 | 5.5 | 9.3 |

TABLE VII

| Wt. Gelatin Lime-cured | Wt. Citr. Acid | Wt. Sod. sulfate | Weight Sugar | Volume Water | Jelly Strength | | |
|---|---|---|---|---|---|---|---|
| | | | | | pH | 2 hrs. | 20 hrs. |
| Grams | Grams | Grams | | | | | |
| 2 | .5 | none | 17.50 | 100 | 3.33 | 6.5 | 13.4 |
| 2 | .5 | .1 | 17.40 | 100 | 3.35 | 8.9 | 15.0 |
| 2 | .5 | .2 | 17.30 | 100 | 3.34 | 9.0 | 15.1 |
| 1.8 | .5 | .2 | 17.50 | 100 | 3.27 | 7.0 | 12.0 |
| 1.7 | .5 | .2 | 17.60 | 100 | 3.25 | 6.1 | 10.2 | tion while containing a reduced concentration of gelatin, which comprises: adding to a gel-forming material comprising an extract of gelatin, a water-soluble sulfate ion-producing composition in an amount between about 1 to 10 per cent based on the dry weight of the gelatin; the said sulfate ion increasing the rate of gelation of the said gelatin in an acidic solution at a gelatin concentration substantially below that normally required to obtain the said rate of gelation.

3. In a process of manufacturing gelatin for gelatin dessert preparations from hydrochloric acid-cured pork skins, said gelatin containing chloride ion and having a rate of gelation lower than gelatin from lime-cured pork skins, the step of adding to said gelatin a sulfate ion producing alkali sulfate in an amount which is at least about 3 per cent based on the dry weight of the gelatin whereby the rate of gelation of said gelatin is increased in a gelatin dessert solution to that of gelatin from lime-cured product in said solution.

4. A process for the manufacture of gelatin having clarity and high rate of gelation when used in gelatin desserts, which comprises: subjecting gelatin-containing raw material to a hydrochloric-acid cure; extracting the gelatin from the cured material whereby a gelatin extract, having a lower rate of gelation than gelatin extracted from lime-cured gelatin-containing material, is obtained; and adding to said gelatin extract from hydrochloric acid-cured material, a water-soluble sulfate ion producing composition in sufficient amount to increase the rate of gelation thereof in gelatin dessert solution to that of gelatin extracted from lime-cured material in said solution.

5. A process of improving the rate of gelation of gelatin extracted from hydrochloric acid-cured gelatin-containing material, said gelatin extract having a rate of gelation lower than a gelatin extract from lime-cured gelatin-containing material, which comprises: incorporating in said gelatin extract employed in a gelatin dessert formula about 1 to 10 per cent of a sulfate ion producing alkali sulfate based upon the dry weight of gelatin extract, whereby the rate of gelation of said gelatin extract is increased in a gelatin dessert solution to that of gelatin extracted from lime-cured gelatin-containing material in said solution.

6. In a process of manufacturing gelatin for gelatin dessert preparations from hydrochloric acid-cured pork skins, said gelatin containing chloride ion and having a rate of gelation lower than gelatin from lime-cured pork skins, the step of adding to said gelatin a water-soluble sulfate ion producing composition in an amount which is at least the molecular equivalent of said chloride ion whereby the rate of gelation of said gelatin is increased in a gelatin dessert solution to that of gelatin from lime-cured product in said solution.

7. A process substantially as described in claim 6 in which the sulfate ion is derived from an alkali sulfate.

8. A process substantially as described in claim 6 in which the sulfate ion is derived from ammonium sulfate.

9. A gelatin product having an improved rate of gelation in an acidic solution, which comprises: an extract of lime-cured gelatin-containing material having in combination a water-soluble sulfate ion-producing composition in an amount between about 1 to 10 per cent based on the dry weight of the gelatin whereby the rate of gelation of said gelatin is substantially increased in an acidic solution.

10. An improved gelatin product having clarity and a high rate of gelation when used in gelatin desserts, which comprises: a gelatin derived from hydrochloric acid-cured material, said gelatin normally having a lower rate of gelation than gelatin extracted from lime-cured material; and a water-soluble sulfate ion producing composition in sufficient amount to increase the rate of gelation thereof to that of gelatin extracted from lime-cured material when the improved product is dissolved in water to form a relatively dilute acidic water solution.

11. A gelatin product having an improved rate of gelation in a dilute acidic solution, which comprises: gelatin having in combination therewith sufficient acid to lower the pH below 4 and an edible, uncolored, water-soluble, sulfate ion-producing composition in an amount between about 1 to 10 per cent based on the dry weight of the gelatin; said sulfate ion substantially increasing the rate of gelation of a solution of the said gelatin in the presence of said acid.

12. A gelatin dessert product having a high rate of gelation in an acidic solution, which comprises: gelatin having in combination therewith sugar, fruit acid, flavor, and an edible, uncolored, water-soluble, sulfate ion-producing composition in an amount between about 1 to 10 per cent based on the dry weight of the gelatin; said sulfate ion substantially increasing the rate of gelation of a solution of the said gelatin having a pH below 4.

13. An improved dessert gelatin product having clarity and a high rate of gelation in gelatin dessert preparations, which comprises: gelatin selected from the group consisting of gelatin from acid-cured gelatin containing material and lime-cured gelatin containing material to which has been added an edible water-soluble sulfate ion-producing composition in an amount between 1 and 10 per cent based on the dry weight of the said gelatin, said added sulfate ion-producing composition substantially increasing the rate of gelation in the acidic solution of gelatin dessert preparations.

14. An improved gelatin product having clarity and a high rate of gelation in gelatin desserts, which comprises: a gelatin derived from hydrochloric acid-cured material, said gelatin normally having a lower rate of gelation than gelatin extracted from lime-cured gelatin; and a sulfate ion-producing alkali sulfate in an amount between 1 and 10 per cent based on the dry weight of the said gelatin to increase the rate of gelation thereof to that of gelatin extracted from lime-cured material when the improved product is dissolved in water to form a relative dilute acidic solution.

15. A gelatin dessert product having a high rate of gelation in an acidic solution, which comprises: gelatin having in combination therewith a fruit acid to produce a solution having a pH below 4 and an edible water-soluble sulfate ion-producing composition in an amount between about 1 and 10 per cent based on the dry weight of the gelatin; said sulfate ion substantially increasing the rate of gelation of the said solution having a pH below 4.

16. In a method of preparing a gelatin dessert product having a high rate of gelation which includes gelatin and a fruit acid; the improvement comprising the step of adding a sulfate ion-producing water-soluble sulfate composition in an amount between 1 and 10 per cent based on the dry weight of the gelatin.

17. In a method of preparing a gelatin dessert product having a high rate of gelation which includes gelatin and a fruit acid; the improvement comprising the step of adding a sulfate ion-producing alkali sulfate in an amount between 1 and 10 per cent based on the dry weight of the gelatin.

DONALD P. GRETTIE.

REFERENCES CITED

The following references are of record in the file of this patent:

UNITED STATES PATENTS

| Number | Name | Date |
|---|---|---|
| 2,175,955 | Harry et al. | Oct. 10, 1939 |
| 2,196,146 | Collins | Apr. 2, 1940 |
| 2,368,393 | Zeigler | Jan. 30, 1945 |

FOREIGN PATENTS

| Number | Country | Date |
|---|---|---|
| 361,138 | Great Britain | Nov. 19, 1931 |